(12) United States Patent
Moolman et al.

(10) Patent No.: US 12,103,860 B2
(45) Date of Patent: Oct. 1, 2024

(54) PREPARATION PROCESS FOR RARE EARTH METAL FLUORIDES

(71) Applicant: THE SOUTH AFRICAN NUCLEAR ENERGY CORPORATION SOC LIMITED, North West Province (ZA)

(72) Inventors: Daniel Moolman, Pretoria (ZA); Ryno Pretorius, Pretoria (ZA); Johannes Petrus Le Roux, Pretoria (ZA); Hendrik Faurie Niemand, Hartbeespoort (ZA)

(73) Assignee: The South African Nuclear Energy Corporation Soc Limited, North West Province (ZA)

( * ) Notice: Subject to any disclaimer, the term of this patent is extended or adjusted under 35 U.S.C. 154(b) by 0 days.

(21) Appl. No.: 16/530,540

(22) PCT Filed: Feb. 2, 2018

(86) PCT No.: PCT/IB2018/050665
§ 371 (c)(1),
(2) Date: Aug. 2, 2019

(87) PCT Pub. No.: WO2018/142337
PCT Pub. Date: Aug. 9, 2018

(65) Prior Publication Data
US 2020/0039835 A1  Feb. 6, 2020

(30) Foreign Application Priority Data
Feb. 3, 2017  (ZA) .................................. 2017/00860

(51) Int. Cl.
*C01F 17/265*  (2020.01)
(52) U.S. Cl.
CPC .................................. *C01F 17/265* (2020.01)

(58) Field of Classification Search
CPC ............................... C01F 17/265; C01F 17/36
(Continued)

(56) References Cited

U.S. PATENT DOCUMENTS

| | | | | |
|---|---|---|---|---|
| 4,752,454 A | * | 6/1988 | Pastor | C01B 9/08 423/19 |
| 5,073,337 A | * | 12/1991 | Schmidt | C01F 17/265 420/83 |

(Continued)

FOREIGN PATENT DOCUMENTS

| | | | |
|---|---|---|---|
| CN | 1 907 859 A | | 2/2007 |
| CN | 101700902 A | * | 5/2010 |

OTHER PUBLICATIONS

International Search Report dated Apr. 6, 2018 from corresponding International Patent Application No. PCT/IB2018/050665, 4 pages.
(Continued)

*Primary Examiner* — James E McDonough
(74) *Attorney, Agent, or Firm* — Ruggiero McAllister & McMahon LLC

(57) ABSTRACT

A method of fluorinating a solid compound of a rare earth metal to produce a fluorinated rare earth metal compound in solid form includes reacting, in a reaction zone, a solid compound of the rare earth metal and gaseous hydrofluoric acid, thus producing the fluorinated rare earth metal compound in solid form. The reaction takes place, in the reaction zone, in the presence of exogenous water, which is water that is exogenous to water that is produced in the reaction zone as water of reaction due to the reaction of the solid compound of the rare earth metal and the hydrofluoric acid.

(Continued)

Conditions of temperature and pressure in the reaction zone avoid condensation of the exogenous water, the water of reaction when present, and the hydrofluoric acid.

1 Claim, 1 Drawing Sheet

(58) Field of Classification Search
USPC .......................................................... 423/263
See application file for complete search history.

(56) References Cited

U.S. PATENT DOCUMENTS

| 5,362,459 | A * | 11/1994 | Greenberg | C01F 17/265 |
|---|---|---|---|---|
| | | | | 423/21.1 |
| 2003/0139639 | A1* | 7/2003 | Otsuka | B01D 53/8662 |
| | | | | 502/200 |
| 2005/0089461 | A1* | 4/2005 | Kanno | B01D 53/8659 |
| | | | | 423/240 R |
| 2007/0235339 | A1* | 10/2007 | Smith | G03F 7/70925 |
| | | | | 204/632 |
| 2012/0164049 | A1* | 6/2012 | Chaput | B82Y 30/00 |
| | | | | 423/263 |
| 2017/0120184 | A1* | 5/2017 | Friedrich | B01J 20/103 |

OTHER PUBLICATIONS

Written Opinion dated Apr. 6, 2018 from corresponding International Patent Application No. PCT/IB2018/050665, 6 pages.

Ansari et al.; "Synthesis of Optically Active Silica-Coated NdF3 Core-shell Nanoparticles", Spectrochimica Acta. Part A: Molecular and Biomolecular Spectroscopy, Elsevier, vol. 86, Oct. 28, 2011, pp. 432-436.

Guo et al.; "Synthesis of REF3 (Re = Nd, Tb) Nanoparticles Via a Solvent Extraction Route"; Materials Research Bulletin, Elsevier, vol. 44, No. 7, Jul. 1, 2009, pp. 1565-1568.

Kwon et al.; "Fluorination of Metals and Metal Oxides by Gas-Solid Reaction"; Journal of Industrial and Engineering Chemistry, vol. 8, No. 5, Sep. 1, 2002, pp. 477-482.

Li Tian, et al.; "Liquid Phase Preparation and Fluorescence of Flake-liked NdF3 Nanomaterials", Materials Research Bulletin, vol. 48m, No. 1, Jan. 1, 2013, pp. 48-51.

Zhao et al.; "A Phase Transfer Assisted Solvo-Thermal Strategy for the Synthesis of REF3 and LN 3+-doped REF3 Nano-/Microcrystals"; Journal of Industrial and Engineering Chemistry, vol. 436, Sep. 16, 2014, pp. 171-178.

Honode et al.; "A Study of the Decomposition of Neodymium Hydroxy Carbonate and Neodymium Carbonate Hydrate"; Journal of Solid State Chemistry, 84, 102-117, 1990.

* cited by examiner

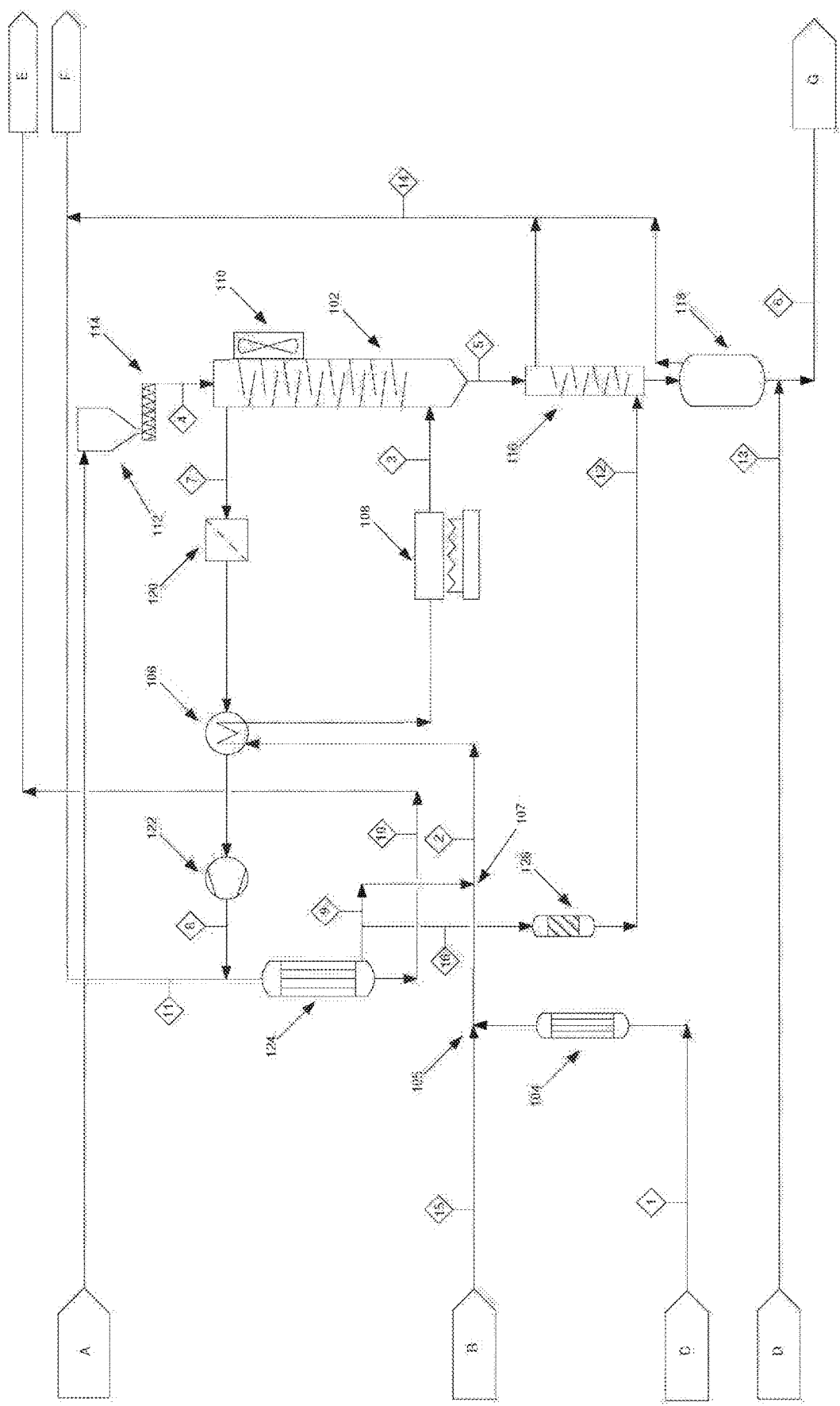

PREPARATION PROCESS FOR RARE EARTH METAL FLUORIDES

CROSS REFERENCE TO RELATED APPLICATION

This application is the U.S. National Stage of International Application No. PCT/IB2018/050665, filed on Feb. 2, 2018, which designates the U.S., published in English, and claims the benefit of South African Patent Application No. 2017/00860, filed on Feb. 3, 2017. The entire teachings of the above applications are incorporated herein by reference.

FIELD OF THE INVENTION

THIS INVENTION relates to rare earth metal fluorides. Broadly, the invention provides a method of preparing a rare earth metal fluoride and extends to a rare earth metal fluoride that is prepared using the method. More specifically, the invention provides a method of preparing neodymium trifluoride and extends to neodymium trifluoride that is prepared using the method.

SUMMARY OF THE INVENTION

RARE EARTH METALS, also referred to as rare earth elements, comprise the fifteen lanthanides of the Periodic Table of Elements, as well as scandium and yttrium.

IN ACCORDANCE WITH A FIRST, BROAD, ASPECT OF THE INVENTION, IS PROVIDED a method of fluorinating a solid compound of a rare earth metal to produce a fluorinated rare earth metal compound in solid form, the method including reacting, in a reaction zone,
- a solid compound of the rare earth metal; and
- gaseous hydrofluoric acid, thus producing the fluorinated rare earth metal compound in solid form, wherein the reaction takes place, in the reaction zone,
- in the presence of exogenous water, which is water that is exogenous to water that may be produced in the reaction zone as water of reaction; and
- under conditions of temperature and pressure which avoid condensation of the exogenous water, the water of reaction when present, and the hydrofluoric acid.

It is noted that "fluorination" in the sense used in this specification envisages, generally, conversion of the solid compound of the rare earth metal into a fluoride of the rare earth metal, or into a fluorine-containing precursor of a fluoride of the rare earth metal.

Since reacting the solid compound of the rare earth metal and gaseous hydrofluoric acid is effected under conditions of temperature and pressure which avoid condensation of the exogenous water, the water of reaction when present, and the hydrofluoric acid, it follows that these conditions are such that the exogenous water, the water of reaction when present, and the hydrofluoric acid remain in gaseous or vapour form in the reaction zone at least during the reaction.

It is noted that the solid compound of the rare earth metal, that is subjected to the fluorination, may be a fluorine-containing solid compound of the rare earth metal, typically other than a fluoride of the rare earth metal. In this sense "fluoride" envisages substantially no further capacity for fluorination. For example, precursors of fluorides are included as possible embodiments of the solid compound of the rare earth metal, that is subjected to the fluorination. In one embodiment, the solid compound of the rare earth metal, that is subjected to the fluorination, may be an oxy-fluoride of the rare earth metal.

In one embodiment of the invention, the fluorinated rare earth metal compound may be a rare earth metal fluoride. In another embodiment of the invention, the fluorinated rare earth metal compound may be a fluorine-containing precursor of a rare earth metal fluoride, e.g. a rare earth metal oxy-fluoride. Thus, in one embodiment of the invention the method may be a method of preparing a rare earth metal fluoride in solid form, and in another embodiment of the invention the method may be a method of preparing a precursor of a rare earth metal fluoride. The fluorination may therefore be partial or complete, wherein "complete" fluorination envisages that the fluorinated rare earth metal compound is a rare earth metal fluoride.

The solid compound of the rare earth metal, that is subjected to the fluorination, may be selected from any one or a combination of any two or more of
- a rare earth metal carbonate;
- a rare earth metal halide;
- a rare earth metal sulphate;
- a rare earth metal oxide;
- a rare earth metal oxalate;
- a rare earth metal hydroxide;
- a rare earth metal nitrate; and
- a fluorine-containing rare earth metal compound that is not fully fluorinated to a fluoride, for example an oxy-fluoride.

The solid compound of the rare earth metal, that is subjected to the fluorination, may, in particular, be a hydrated, i.e. crystalline, form thereof. In such a case, the conditions of temperature and pressure under which the reaction takes place in the reaction zone may be such that the hydrated form is not dehydrated, at least not until the reaction commences, i.e. such that crystalline water is present at least when the reaction commences, and more preferably at least not until the reaction has at least partly taken place.

The exogenous water may comprise the crystalline water when the solid compound of the rare earth metal is a hydrated form thereof. The exogenous water may also, or instead, comprise water vapour that is not formed in the reaction zone, e.g. water vapour that is formed outside of the reaction zone. Such water vapour may for example be water vapour that formed outside of the reaction zone as water of reaction due to reaction between the compound of the rare earth metal and the hydrofluoric acid outside of the reaction zone, and/or the exogenous water may be water vapour, e.g. generated independently of the reaction, that is intentionally fed into the reaction zone.

THE INVENTION EXTENDS, BROADLY, TO a fluorinated rare earth metal compound that is prepared according to the method of the first, broad aspect of the invention.

IN ACCORDANCE WITH A SECOND, MORE SPECIFIC ASPECT OF THE INVENTION, IS PROVIDED a method of preparing, as a fluorinated rare earth metal compound, neodymium trifluoride ($NdF_3$) in solid form, the method including reacting, in a reaction zone, as a solid compound of a rare earth metal that is not a rare earth metal fluoride, solid neodymium carbonate ($Nd_2(CO_3)_3$) with gaseous hydrofluoric acid (HF) to produce the neodymium trifluoride in solid form according to reaction equation 1

$$Nd_2(CO_3)_3(s) + 6HF(g) \rightarrow 2NdF_3(s) + 3CO_2(g) + 3H_2O(g) \quad \text{(Eq. 1)},$$

wherein the reaction takes place, in the reaction zone, in the presence of exogenous water, which is water that is exogenous to the water that is produced in the reaction zone as water of reaction according to reaction equation 1; and under conditions of temperature and pressure that avoid condensation of the exogenous water, the water of reaction, and the hydrofluoric acid.

It will be appreciated that the method of the present aspect of the invention is effectively a more specific embodiment of the method of the earlier aspect of the invention. Thus, absent a specific indication to the contrary, the following statements apply evenly to the earlier aspect of the invention.

The hydrofluoric acid may comprise anhydrous hydrofluoric acid.

The neodymium carbonate may comprise hydrated neodymium carbonate ($Nd_2(CO_3)_3 \cdot xH_2O$, wherein x is any number greater than 0, not limited to whole numbers).

The exogenous water may then comprise the crystalline water of the hydrated neodymium carbonate. In such a case, as mentioned above, the conditions of temperature and pressure under which the reaction according to reaction equation 1 takes place in the reaction zone may be such that the hydrated neodymium carbonate is not dehydrated, at least not until the reaction commences (i.e. such that crystalline water is present at least when the reaction commences), and more preferably at least not until the reaction has at least partly taken place. Thus, the conditions may be such that the hydrated neodymium carbonate remains hydrated at least until the reaction commences, and more preferably at least until the reaction has at least partly taken place.

The exogenous water may also, or instead, comprise water vapour that is not formed in the reaction zone, e.g. water vapour that is formed outside of the reaction zone as water of reaction due to reaction between the neodymium carbonate and the hydrofluoric acid according to reaction equation 1 outside of the reaction zone, and/or water vapour that is intentionally fed into the reaction zone.

The reaction may take place in the reaction zone at a temperature as low as 20° C. More typically, at atmospheric pressure, the reaction may take place in the reaction zone at a temperature that is equal to or greater than 80° C. and less than 300° C. It is envisaged that the reaction may take place at temperatures in excess of 300° C. At such, elevated, temperatures, when the solid compound of the rare earth metal is a hydrated form thereof, an increased operating pressure would have to be selected that is commensurate with retention of at least some moisture within the matrix of the hydrated form. I.e. the solid compound of the rare earth metal may be a hydrated form thereof, in which case, when the reaction takes place at a temperature of 300° C. or more, a condition of a pressure at which the reaction takes place would be selected to be above atmospheric pressure and such that the hydrated form is not dehydrated, at least not until the reaction has commenced.

The method may include introducing the solid compound of the rare earth metal, e.g. the neodymium carbonate, and the hydrofluoric acid, as well as the exogenous water vapour when comprised in the exogenous water, into the reaction zone. Such introduction may be simultaneous, i.e. the solid compound of the rare earth metal, e.g. the neodymium carbonate, and the hydrofluoric acid, as well as the exogenous water vapour when comprised in the exogenous water, may be co-fed to the reaction zone, typically separately of each other, although the exogenous water vapour, when comprised in the exogenous water, may be introduced in combination with either one or both of the solid compound of the rare earth metal, e.g. the neodymium carbonate, and the hydrofluoric acid.

Introducing the solid compound of the rare earth metal, e.g. the neodymium carbonate, and the hydrofluoric acid into the reaction zone may be in either of counter-current or co-current fashion. Counter-current is preferred.

Introducing the solid compound of the rare earth metal, e.g. the neodymium carbonate, and the hydrofluoric acid into the reaction zone may be effected under fluidizing or non-fluidizing conditions of the neodymium carbonate.

Introducing the solid compound of the rare earth metal, e.g. the neodymium carbonate, into the reaction zone may be under gravity. Thus, introducing the hydrofluoric acid into the reaction zone may be in an opposite direction to the effect of gravity on the solid compound of the rare earth metal, e.g. the neodymium carbonate, when introducing the solid compound of the rare earth metal, e.g. the neodymium carbonate, and the hydrofluoric acid into the reaction zone in counter-current fashion.

The hydrofluoric acid may be introduced into the reaction zone using a carrier gas. In other words, the hydrofluoric acid may be introduced into the reaction zone in a mixture comprising the hydrofluoric acid and the carrier gas.

The carrier gas may be nitrogen gas or carbon dioxide gas. Preferably, the carrier gas is carbon dioxide gas.

The carbon dioxide gas, as the carrier gas, may be or may include carbon dioxide gas that is recovered from carbon dioxide product produced according to reaction equation 1, due to the reaction between the solid compound of the rare earth metal, e.g. the neodymium carbonate, and the hydrofluoric acid that takes place inside the reaction zone. Alternatively, or additionally, the carbon dioxide gas, as the carrier gas, may be or may include carbon dioxide gas that is recovered from carbon dioxide product gas produced by prior and/or concurrent reactions of the solid compound of the rare earth metal, e.g. the neodymium carbonate, and the hydrofluoric acid, according to reaction equation 1, outside of the reaction zone.

The solid compound of the rare earth metal, e.g. the neodymium carbonate, may be in a granular form, e.g. as granules or pellets.

As envisaged by the exemplary language used, the above-mentioned features of the second, more specific aspect of the invention that relate to neodymium carbonate are regarded as being evenly applicable to other solid compounds of rare earth metals, such as those identified with respect to the first, broad aspect of the invention.

THE INVENTION EXTENDS TO neodymium trifluoride that is prepared according to the second, more specific method of the invention.

DESCRIPTION OF THE DRAWING

FIG. 1 is a method for producing neodymium trifluoride in accordance with the present invention.

DETAILED DESCRIPTION OF AN EXEMPLARY EMBODIMENT OF THE INVENTION

THE INVENTION WILL NOW BE DESCRIBED IN MORE DETAIL, with reference to the accompanying drawing which diagrammatically shows a process for implementing a method of producing neodymium trifluoride in accordance with the invention.

Referring to the drawing, reference numeral 100 generally indicates a process for implementing a method of producing, as a fluorinated rare earth metal compound in solid form, neodymium trifluoride in accordance with the invention.

The process 100 includes a reactor vessel 102 in which hydrated neodymium carbonate pellets are reacted with anhydrous hydrofluoric acid (HF) in the presence of a carrier gas, which is carbon dioxide, to form neodymium trifluoride, carbon dioxide and water according to reaction equation 1. The reactor vessel 102 is, in particular, an inclined plate reactor.

The reactor vessel 102 is a vertical column reactor vessel, including downwardly inclined plates that are configured to achieve a predetermined residence time of the neodymium carbonate pellets in the reactor vessel 102, when the pellets are fed to the top of the reactor vessel 102 as hereinafter described.

Further features of the process 100 will appear from the description of its typical operation, which follows.

HF is withdrawn from a storage vessel or other source thereof (see C) along line 1, and is evaporated and heated to 80° C. in an evaporator 104, thereby obtaining evaporated, heated HF.

The evaporated, heated HF is, at start-up, mixed at mixing point 105 with carbon dioxide gas make-up from B, along line 15, to obtain a gas mixture of HF and carbon dioxide at an HF mass concentration of 10%. After start-up, the heated, evaporated HF is mixed, at mixing point 107, with carbon dioxide gas along line 9, which carbon dioxide gas is recovered from the reactor vessel 102 as hereinafter described, thereby to obtain the gas mixture of HF and carbon dioxide.

The gas mixture is fed to a heat exchanger 106 along line 2 and is heated with hot off-gas from the reactor vessel 102, along line 7, thereby obtaining a heated gas mixture.

The heated gas mixture is then fed to an electrical heater 108, which heats the mixture further, to a temperature of from 100° C. to 350° C. in the present embodiment, thereby obtaining a further heated gas mixture. The temperature to which the further heated gas mixture is heated is preferably from 10° C. to 50° C. higher than the operating temperature of the reactor vessel 102. Generally, the temperature and pressure of the further heated gas mixture, particularly at the inlet thereof to the reactor vessel 102, is preferably such that conditions that are conducive to condensation of water and/or HF in the feed line thereof (line 3 in the drawing) and in the reactor vessel 102 are avoided.

The further heated gas mixture is fed to the bottom of the reactor vessel 102, along line 3, thus rising through the reactor vessel 102. Simultaneously, the hydrated neodymium carbonate pellets are fed, along line 4 at a predetermined rate, to the top of the reactor vessel 102 from a feed hopper 112 by means of a screw conveyor 114, thus descending through the reactor vessel 102 under gravity. The neodymium carbonate pellets are fed to the hopper 112 from a source of neodymium carbonate pellets (see A).

Thus, the HF and neodymium carbonate pellets are contacted in a counter-current manner in the reactor vessel 102.

Operating conditions of the reactor vessel 102 include a temperature of between 90° C. and 300° C., preferably <300° C., and a pressure that is such that condensation of water and HF in the reactor vessel 102 is avoided. These conditions of temperature and pressure are selected to avoid condensation of HF and water vapour and to avoid dehydration of the hydrated neodymium carbonate.

Contact between the HF and the neodymium carbonate in the reactor vessel 102 results in reaction between the HF and the neodymium carbonate in accordance with reaction equation 1. The reaction is exothermic and the heat of reaction is removed by air cooling with air cooler 110. The reaction forms neodymium trifluoride, water vapour (as water of reaction) and carbon dioxide. The neodymium trifluoride collects to the bottom of the reactor vessel 102 while the water vapour and carbon dioxide, along with unreacted HF, rise to the top of the reactor vessel 102 to leave the reactor vessel 102, along line 7, as off-gas.

It will be appreciated that wherever in the reactor vessel 102 the reaction takes place, a reaction zone exists. A reaction zone may therefore comprise a single neodymium carbonate pellet that is in contact with HF, a plurality of neodymium carbonate pellets that are in contact with HF, or even all of the neodymium carbonate pellets that are in contact with HF inside the reactor vessel 102.

Exogenous water may be present in each reaction zone, or in at least some of the reaction zones, the exogenous water at least comprising the crystalline water of the hydrated neodymium carbonate. When the reaction zone is not regarded as comprising all of the neodymium carbonate pellets that are in contact with HF inside the reactor vessel 102, the exogenous water present in any particular reaction zone may also comprise water vapour generated as water of reaction in another reaction zone, in accordance with reaction equation 1.

The neodymium trifluoride is removed from the bottom of the reactor vessel 102 along line 5 and is cooled in a counter-current cooler 116 with carbon dioxide that is fed to the cooler 116 along line 12. Thus, cooled neodymium trifluoride is obtained, which is fed to a product vessel 118.

The cooled neodymium trifluoride is purged, in the product vessel 118, with nitrogen gas to remove residual traces of HF. The nitrogen gas is fed to the product vessel 118 along line 13, from a nitrogen source (see D).

After purging, the neodymium trifluoride is withdrawn from the product vessel 118 along line 6 for further handling (see G).

The off-gas of carbon dioxide, water vapour and unreacted HF that rises to the top of the reactor vessel 102 is withdrawn, as an off-gas mixture, from the reactor vessel 102 along line 7. The mixture is filtered in filter 120 and is cooled by heat exchange with the hot gas mixture in heat exchanger 106, thereby obtaining a cooled off-gas mixture.

The cooled off-gas mixture is compressed in a compressor 122, which also sustains the operating pressure of the reactor vessel 102, thereby obtaining a cooled, compressed off-gas mixture. The cooled, compressed off-gas mixture is withdrawn from the compressor 122 along line 8.

Excess carbon dioxide is bled off from the cooled, compressed off-gas mixture along line 11 (and see F), which also contains some water vapour and unreacted HF. Remaining carbon dioxide is stripped of water vapour by condensation of the water vapour in a condenser 124. The condensed water, leaving the condenser along line 10, contains dissolved HF and carbon dioxide.

Carbon dioxide, containing uncondensed HF and moisture, is withdrawn from the condenser 124 along line 9 and is mixed with the heated gas mixture, including HF from the HF evaporator, at the mixing point 107. The water content of this stream, which forms part of the stream that is ultimately fed to the reactor vessel 102, is one possible source of exogenous water that is intentionally fed to the reactor vessel 102.

A small stream of carbon dioxide is bled along line 16 from line 9 and stripped of HF in a HF scrubber 126. The resulting scrubbed carbon dioxide stream is utilized to cool the neodymium product, being fed to the cooler 116 along line 12.

The Applicant believes that by operating the reactor vessel 102 such that condensation of HF, water of reaction and exogenous water, and dehydration of hydrated neodymium carbonate, are avoided, reaction, and more specifically mass transfer during reaction, between HF and neodymium carbonate is encouraged by the presence of water, specifically adsorbed water. Thus, the Applicant has found that neodymium trifluoride can be produced at more moderate temperatures, while still showing an acceptable rate of reaction. Generally, in the Applicant's experience, conventional wisdom suggests conducting a reaction such as reaction equation 1 at relatively high temperatures (300° C. and higher at atmospheric pressure) to exploit the higher reactivity of HF at such higher temperatures. This requirement is obviated by the present invention.

The invention claimed is:

1. A method of producing solid neodymium trifluoride ($NdF_3$), the method, comprising:
   introducing pellets consisting of solid neodymium carbonate hydrate to a reactor;
   introducing an anhydrous gas stream comprising hydrogen fluoride to the reactor; and
   reacting the solid neodymium carbonate hydrate with the hydrogen fluoride to produce pellets consisting of neodymium trifluoride, wherein the reaction takes place at a temperature that is equal to or greater than 80° C. and equal to or less than 250° C. and at a pressure which avoids condensation of any water present or generated in the reactor.

* * * * *